United States Patent [19]

James et al.

[11] 4,335,517

[45] Jun. 22, 1982

[54] ZERO FORCE TOUCH PROBE

[75] Inventors: Harold S. James, Lynchburg; Ronald N. Roseveare, Evington, both of Va.

[73] Assignee: The Babcock & Wilcox Company, New Orleans, La.

[21] Appl. No.: 242,866

[22] Filed: Mar. 12, 1981

[51] Int. Cl.³ .............................................. G01B 7/28
[52] U.S. Cl. ................................ 33/174 L; 33/174 P; 33/143 L
[58] Field of Search ............... 33/174 L, 169 R, 172 E, 33/143 L, 147 N, 148 H, 169 C, 174 P, 174 Q

[56] References Cited

U.S. PATENT DOCUMENTS

| | | | |
|---|---|---|---|
| 3,357,238 | 12/1967 | Musante et al. | 33/174 P |
| 3,470,618 | 10/1969 | Richer | 33/169 C |
| 3,795,054 | 3/1974 | Kinney | 33/174 L |
| 4,035,922 | 7/1977 | Ven Voros | 33/143 L |
| 4,120,196 | 10/1978 | Hamilton et al. | 33/174 L |
| 4,181,958 | 1/1980 | Juiengel et al. | 33/174 L |

Primary Examiner—Willis Little
Attorney, Agent, or Firm—James A. Hudak; Vytas R. Matas; Robert J. Edwards

[57] ABSTRACT

A co-ordinate measuring system for determining the relative measurements of an object is disclosed. The system utilizes a probe which has a plurality of faces which are interconnected so as to form two parallel "X" co-ordinate probe surfaces (12) and two parallel "Y" co-ordinate probe surfaces (14). At the instant the probe contacts a surface on the object being measured, an electrical circuit is completed through the probe to ground potential via the object, causing the measurement to be displayed on a visual display device (20 or 22). In this manner, measurements along the "X" and "Y" co-ordinates can be made and recorded at the instant the probe contacts the respective surfaces. An automatic unlatching feature is provided wherein the probe must be a predetermined distance from both the "X" and "Y" surfaces before the system automatically resets.

7 Claims, 1 Drawing Figure

ZERO FORCE TOUCH PROBE

TECHNICAL FIELD

The present invention relates to probes used in co-ordinate measuring machines, and more particulary to a highly accurate probe and related control and display apparatus therefor.

BACKGROUND ART

The use of co-ordinate measuring machines has some inherent problems. For example, precise measurement of a part with such a machine usually is a time consuming and difficult task because of probe and/or part deflection upon contact. The latter is particularly true when the part is fragile or easily deflected. Such deflection produces inaccurate measurements and prevents repeatability of measurements. Even if such deflection is not present, the machine utilized might require that the operator determine when to latch and record the data. In such a case, the operator depends upon his sense of feel to determine when the probe is in the correct position for recording of data. Inasmuch as the sense of feel differs between operators and even an individual operator's sense of feel is not highly repeatable, precise measurement of the part being measured is extremely difficult. In addition, it has been found that those systems that are of the automatic latching type generally deflect the part and/or the probe to some degree prior to latching and thus precise measurements are difficult to obtain from such systems.

Because of the foregoing, it has become desirable to develop apparatus for a co-ordinate measuring machine which results in precise, repeatable measurements regardless of probe and/or part deflection and, in which, automatic unlatching of this data, after recording, is available to the operator.

SUMMARY OF THE INVENTION

The present invention solves the aforementioned problems associated with the prior art as well as other problems by utilizing the principle of instantaneous electrical contact closure when a probe surface contacts a surface of the part to be measured. In essence, the probe is one contact of a switch and the other switch contact is the part being measured. This is accomplished by providing a probe which typically consists of four insulated faces wherein opposite faces are interconnected so as to form two parallel "X" co-ordinate probe contact surfaces and two parallel "Y" co-ordinate probe contact surfaces. The part to be measured is electrically connected to ground potential. At the instant one of the probe contact surfaces touches the surface of the part to be measured, an electrical circuit is made through the probe surface to ground potential via the part, and the measurement is automatically displayed on a first visual display device. The other probe contact surface can then touch another surface causing another electrical circuit to be made to ground potential via the part, and the measurement is automatically displayed on a second visual display device. After the operator has recorded the measurement, the system can be manually reset unlatching the data exhibited on the visual display devices. Alternatively, the data can be automatically recorded and subsequently unlatched. During such an automatic unlatching process, the relative position of the displacement heads on the co-ordinate measuring machine is compared with the data shown on the visual display devices and if the difference therebetween exceeds a predetermined amount, the data displayed is automatically unlatched and the system is reset.

In view of the foregoing, it will be seen that one aspect of the present invention is to provide apparatus for a co-ordinate measuring machine so that accurate, repeatable measurements can be made with such a machine.

Another aspect of the present invention is to provide apparatus for a co-ordinate measuring machine wherein the measurement of parts occurs at the instant the probe touches the surface thereof.

Still another aspect of the present invention is to provide apparatus for co-ordinate measuring machine wherein deflection of the probe and/or the part being measured does not affect the measurements being taken.

Yet another aspect of the present invention is to provide apparatus for automatically recording the measurements taken by the probe.

A further aspect of the present invention is to provide apparatus for automatically unlatching the data displayed and/or recorded after the probe has been moved a predetermined distance away from the surface of the part being measured.

These and other aspects of the present invention will become more clearly understood after a review of the following description of the preferred embodiment when considered with the following drawing.

DESCRIPTION OF THE PREFERRED EMBODIMENT

Figure 1:
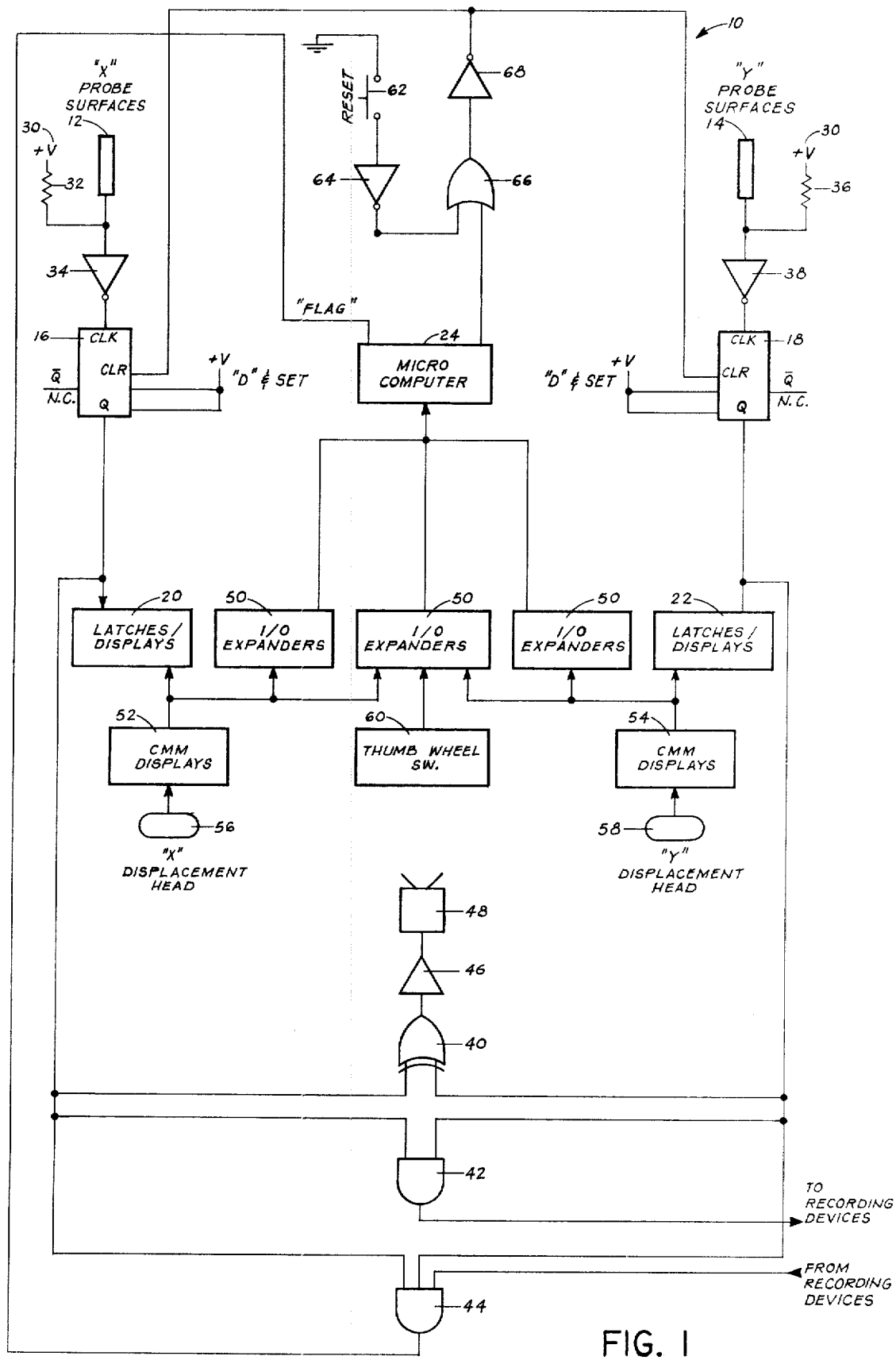
FIG. 1 is an electrical schematic of the invention of the disclosure.

Referring now to the drawing where the illustration is for the purpose of describing the presently known preferred embodiment of the present invention and is not intended to limit the invention hereto, FIG. 1 is a schematic diagram of the circuit 10 used by the apparatus of the present invention. The circuit utilizes a "touch" probe which typically consists of four insulated faces, having opposite faces interconnected so as to form two "X" co-ordinate probe contact surfaces 12 and two "Y" co-ordinate probe contact surfaces 14. Contact of these probe surfaces 12, 14 on a clean conductive surface causes a change of state in flip-flop devices 16, 18 respectively which, in turn, control latch display devices 20, 22 respectively. The operation of these display devices 20, 22 and the entire system can, in turn, be controlled by a microcomputer 24.

Each of the two probe surfaces 12, i.e., the probe surfaces for the "X" co-ordinate axis, is connected to a positive voltage source 30 through a resistance 32. Typically, the voltage source 30 is low voltage, e.g., 5 volts. The probe surfaces 12 are also connected to the input of an inverting amplifier 34 whose output is connected to the clock or trigger terminal of the flip-flop 16. The Q output of the flip-flop 16 is connected to the latch display device 20 which, when actuated, "freezes" and displays the measurement taken by the probe along with the "X" axis. Similarly, each of the two probe surfaces 14, i.e., the probe surfaces for the "Y" co-ordinate axis, is connected to the positive voltage source 30 through a resistance 36 and is connected to the input to an inverting amplifier 38 whose output is connected to the clock or trigger terminal of the flip-flop 18. The Q output of the flip-flop 18 is connected to the latch display device 22 which, when actuated, "freezes" and displays the measurement taken by the probe along with the "Y" axis.

The Q outputs of both flip-flops 16, 18 are also connected to the inputs of an exclusive "OR" gate 40 and to "AND" gates 42, 44. The output of "OR" gate 40 is connected to the input of an amplifier 46 whose output is, in turn, connected to the input of a buzzer 48, the operation of which will be hereinafter described. The output of "AND" gate 42 is connected to external recording devices (not shown) which are used for recording the data shown on the latch display devices 20, 22. The recording devices are provided with means for signalling when the data has been recorded. These signalling means are connected to an input of the "AND" gate 44 along with the Q outputs of the flip-flops 16, 18. The output of the "AND" gate 44 is, in turn, connected to the microcomputer 24.

The microcomputer 24 is connected to a plurality of input/output expanders 50 which are connected to the latch display devices 20, 22 and to the co-ordinate measuring machine (CMM) displays 52, 54 which display the relative position of the "X" and "Y" displacement heads, 56, 58, respectively. Inasmuch as the foregoing displacement head display devices are a part of the co-ordinate measuring machine control, they will not be described in any greater detail. A thumbwheel switch 60 is also provided and connected to the input/output expanders 50 and is used to adjust the sensitivity of the system, as will be hereinafter described.

The system can be manually reset by the operator by pressing a reset button 62 or it can be reset automatically by the microcomputer 24. One side of the reset button 62 is connected to ground while the other side is connected to the input of an inverting amplifier 64 whose output is connected to one of the inputs of an "OR" gate 66, the other input of which is connected to the output of the microcomputer 24. The output of the gate 66 is, in turn, connected to the input of an inverting amplifier 68 whose output is connected to the clear terminals on both of the flip-flops 16, 18.

In order to operate the probe, whether in the manual mode of operation or the automatic mode, the part being measured is electrically connected to ground potential. If the probe is being operated manually, it is allowed to touch both the "X" and "Y" surfaces of the part. While this is occurring, the "X" and "Y" displacement heads cause the actual position in space of the probe to be shown on the CMM displays 52, 54 and on the latches display devices 20, 22 respectively. At the instant the probe touches either the "X" or "Y" axis of the part, an electrical circuit is made through either probe surfaces 12 or 14 to ground potential, via the part being measured. This change in voltage potential causes inverting amplifier 34 or 38 to apply a positive voltage to either flip-flop 16 or 18 and trigger same. Flip-flop 16 would be actuated for a measurement in the "X" direction whereas flip-flop 18 would be actuated for a measurement in the "Y" direction. When flip-flop 16 is triggered, its Q output is actuated and a signal is transmitted to the inhibit terminal of latch display device 20 instantaneously "freezing" the probe position data shown on the display at that time, i.e., the position of the probe in the "X" direction. Similarly, when flip-flop 18 is triggered, its Q output is actuated and a signal is transmitted to the inhibit terminal of latch display device 22 instantaneously "freezing " the probe position data shown on the display at that time, i.e., the position of the probe in the "Y" direction. After the position data is "frozen" on the displays 20, 22, the operator of the apparatus can manually record the data so displayed and can press the reset button 62, which applies a reset pulse to the clear (CLR) terminals on flip-flops 16, 18 via inverting amplifier 64, "OR" gate 66, and inverting amplifier 68. The application of this reset pulse to flip-flops 16, 18 causes the deactuation of the Q outputs on these devices which, in turn, causes the signal to the inhibit terminals on the latch display devices 20, 22 to be extinguished permitting the latch display devices 20, 22 to once again be able to follow the actual location of the "X" and "Y" displacement heads.

To assist the operator of the apparatus in determining when the probe actually contacts the surface being measured, the Q outputs of the flip-flops 16, 18 can also be connected to the input of an exclusive "OR" gate 40, as previously indicated. The output of this gate 40 is energized whenever either of the Q outputs of the flip-flops 16, 18 is energized and stays energized until the Q outputs of the other flip-flop is energized, at which time the gate 40 is deenergized. In this manner, the actuation of the buzzer 48 indicates to the operator that contact has been made by either the "X" or "Y" surfaces of the probe with the part being measured. The operator can then move the probe so that the other surface thereof can contact the other surface of the part being measured. When this is accomplished, the buzzer 48 is deactuated which indicates to the operator that both surfaces have been measured.

Rather than having the operator manually record the "X" and "Y" readings, they can be recorded automatically. This is accomplished through the use of the "AND" gate 42 which, as previously mentioned, is connected to the Q outputs of flip-flops 16, 18. When both flip-flops 16, 18 have been actuated, the output of the "AND" gate 42 is energized signalling the recording devices to record the data presently displayed on the latch display devices 20, 22. After the data has been recorded, the recording devices produce an output signal which is received by "AND" gate 44 actuating same and producing a signal which can be used to actuate a signalling device (not shown) so as to indicate to the operator that the recording procedure has been completed. Alternatively, the signal produced by "AND" gate 44 can be applied as an input signal (flag signal) to the microcomputer 24 to start an automatic unlatching sequence, hereinafter described. It should be noted that if automatic data recording is not desired, the output signal from "AND" gate 42 can be applied directly to the microcomputer 24 and used as the "flag" signal thereto to start the automatic unlatching sequence.

The automatic unlatching sequence is initiated by the "flag" signal to the microcomputer 24. Upon receipt of the "flag" signal, the four most significant digits of the "X" and "Y" latched data are read through the input/output expanders 50 into the memory associated with microcomputer 24. After this has been accomplished, the four most significant digits of the relative position of the "X" displacement head are read through the input/output expanders 50 into the memory associated with microcomputer 24. The signs of the foregoing data and the reading of the thumbwheel switch 60 are then read through the input/output expanders 50 into the same memory. The microcomputer 24 compares the signs of the latched "X" data and the relative position of the "X" displacement head, determines whether an addition or subtraction operation must be performed and in what order so that a positive number will result, and performs the required mathematical operation. The microcomputer 24 then compares the result with the setting shown on the thumbwheel switch 60, and if it exceeds same, sets a data bit indicating the status of the "X" data channel.

After the foregoing operation has been completed, the four most significant digits of the relative position of the "Y" displacement head are read through the input-/output expanders 50 and into the memory associated with microcomputer 24. The microcomputer 24 then performs the same mathematical operations for the latched "Y" and the relative position of the "Y" displacement head as it did for the respective "X" parameters and compares the result with the setting on the thumbwheel switch 60. If the results for both the "X" data channel and the "Y" data channel exceed the setting on the thumbwheel switch 60, the microcomputer 24 sends a reset pulse to the clear (CLR) terminals on flip-flop 16, 18 via "OR" gate 66, and inverting amplifier 68 which causes the deactuation of the Q outputs on the flip-flops 16, 18 which, in turn, causes the extinguishment of the signals to the inhibit terminals on the latch display device 20, 22 permitting these display devices to once again follow the actual location of the "X" and "Y" displacement heads.

Alternatively, arithmetic logic units can be used in place of the microcomputer 24. In this case, the arithmetic logic units would be electrically interconnected so that addition or subtraction operations could be performed depending upon the signs of the latched "X" and "Y" data and the positions of the "X" and "Y" displacement heads. If the signs are equal (of the same polarity), subtraction of the position data and the latched data would take place. If the signs are of the opposite polarity, addition of these data occurs. The result is then compared with the setting on the thumbwheel switch 60 and if the result for both the "X" and "Y" data channels is greater than the thumbwheel switch setting, unlatching of the data displayed on the latch display devices 20, 22 takes place. If the result for both the "X" and "Y" data channels is not greater than the thumbwheel setting, the foregoing operation is repeated until the result for both channels is greater, at which time unlatching of the data displayed on the latch display devices 20, 22 occurs.

From the foregoing, it is apparent that the automatic unlatching operation is desirable inasmuch as it relieves the operator of the device from performing an additional operation, viz., resetting the apparatus after recording the data. In addition, manual unlatching of the latch display devices is sometimes not desirable because of the probe bounce. The probe can lose contact numerous times during the process of latching or unlatching. The flip-flops 16, 18 eliminate probe bounce interference during the latching process by recording the coordinate information upon initial contact of the probe with the part being measured. Thus, probe bounce during latching is immaterial since data recording occurs upon initial contact of the probe with the part being measured. Similarly, probe bounce during the unlatching operation has no effect since the probe must be a certain distance, determined by the thumbwheel switch 60, from the part before unlatching can occur.

Certain modifications and improvements will occur to those skilled in the art upon reading the foregoing. It should be understood that all such modifications and improvements have been deleted herein for the sake of conciseness and readability but are properly within the scope of the following claims. As an example of these modifications and improvements, the invention is not limited to two axes or to rectilinear systems. One, two, or three axes can be employed.

We claim:

1. A co-ordinate measuring system for determining the relative dimensions of an object comprising means for measuring the relative dimensions of the surfaces defining said object, said measuring means comprising a probe having a plurality of contact surfaces, each of said contact surfaces being insulated from the other of said contact surfaces and being selectively interconnected with the other of said contact surfaces to form one or more probe contact surfaces for one co-ordinate direction and one or more probe contact surfaces for another co-ordinate direction, and means for displaying the said relative dimensions determined by said measuring means, actuation of said measuring means causing said displaying means to display said relative dimensions at the instant contact is made by said measuring means with said surface being measured.

2. The co-ordinate measuring system as defined in claim 1 wherein said measuring means completes an electrical circuit through said object being measured at the instant one of said insulated contact surfaces of said measuring means makes contact with said surface being measured.

3. The co-ordinate measuring system as defined in claim 2 wherein the completion of said electrical circuit through said object causes said displaying means to display said dimensions at the instant said measuring means makes contact with said surface being measured.

4. The co-ordinate measuring system as defined in claim 1 further including means indicating when contact with a surface of said object being measured in said one co-ordinate direction has been made by one of said probe contact surfaces for said one co-ordinate direction.

5. The co-ordinate measuring system as defined in claim 4 wherein said indicating means is actuated at the instant one of said probe contact surfaces for said one co-ordinate direction makes contact with said surface being measured in said one co-ordinate direction and remains actuated until said one of said probe contact surfaces for said another co-ordinate direction makes contact with another of said surfaces being measured in said another co-ordinate direction.

6. The co-ordinate measuring system as defined in claim 1 further including means for recording the relative dimensions shown on said displaying means and means for indicating when the recording process has been completed.

7. The co-ordinate measuring system for determining the relative dimensions of an object comprising means for measuring the relative dimensions of the surfaces defining said object, said measuring means comprising a probe having a plurality of contact surfaces, each of said contact surfaces being insulated from the other of said contact surfaces and being selectively interconnected with the other of said contact surfaces to form one or more probe contact surfaces for one co-ordinate direction and one or more probe contact surfaces for another co-ordinate direction, means for displaying said relative dimensions determined by said measuring means, said measuring means completing an electrical circuit through said object being measured at the instant one of said insulated contact surfaces of said measuring means makes contact with said surface being measured causing said displaying means to display said dimensions at said instant of surface contact, and means for comparing said relative dimensions displayed on said displaying means with the relative location of said measuring means, said comparing means causing said displaying means to be reset when the difference between said relative dimensions and said relative location exceeds a predetermined value.

* * * * *